Figure 1:
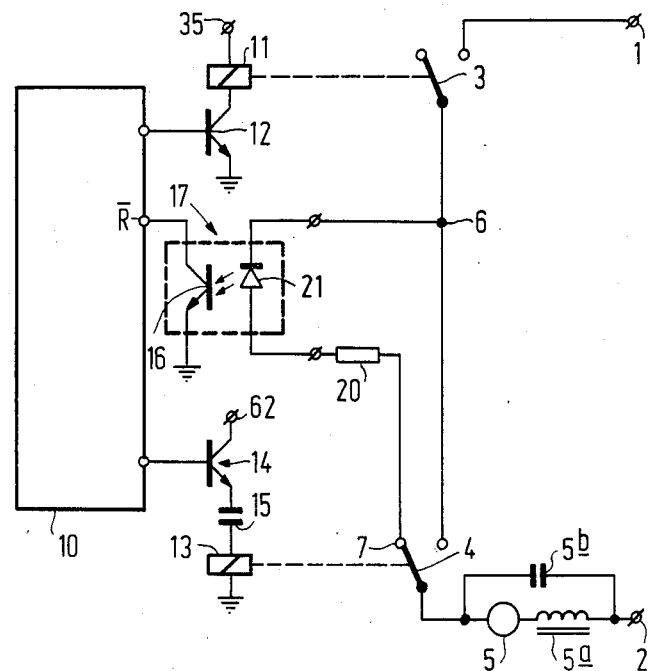

United States Patent [19]

Nicolai et al.

[11] Patent Number: 4,570,109

[45] Date of Patent: Feb. 11, 1986

[54] IRRADIATION DEVICE

[75] Inventors: Haayo Nicolai; Hendricus J. Duipmans, both of Drachten, Netherlands

[73] Assignee: U.S. Philips Corporation, New York, N.Y.

[21] Appl. No.: 573,248

[22] Filed: Jan. 23, 1984

[30] Foreign Application Priority Data

Feb. 3, 1983 [NL] Netherlands .......................... 8300394

[51] Int. Cl.4 .................... H05B 37/02; H05B 39/06; H05B 41/04; H05B 41/18
[52] U.S. Cl. ................... 315/362; 307/141.4; 307/142; 315/119; 315/121; 361/192; 361/194
[58] Field of Search ............... 315/360, 362, 121, 119; 361/71, 72, 73, 191, 192, 193, 194, 195, 171; 307/141.4, 142

[56] References Cited

U.S. PATENT DOCUMENTS

| | | | |
|---|---|---|---|
| 2,760,116 | 8/1956 | Yaeger | 361/71 |
| 3,927,348 | 12/1975 | Zawadski | 315/121 |
| 4,189,665 | 2/1980 | Van der Meulen | 315/362 |
| 4,207,500 | 6/1980 | Duve et al. | 315/119 |
| 4,303,867 | 12/1981 | Van der Meulen | 315/360 |

Primary Examiner—Saxfield Chatmon
Attorney, Agent, or Firm—Robert T. Mayer; Bernard Franzblau

[57] ABSTRACT

An irradiation device including a series arrangement of an ultraviolet radiation source (5), a first switch (3) and a second switch (4). Under normal conditions the radiation source (5) is switched on and off by the first switch (3). The second switch (4) is operative only if the first switch (3) fails. By means of a simple circuit (7, 20, 17, 6; R̄), the defective device cannot be switched on again.

4 Claims, 2 Drawing Figures

IRRADIATION DEVICE

The invention relates to device irradiation with provided with two input terminals intended to be connected to an electric voltage source, the two input terminals being interconnected by means of a series arrangement of at least one metal vapour discharge tube shunted by an electrically conducting circuit element, a first switch, and a second switch provided with a switching arm, the switching arm being in electrical contact with a part of the second switch remote from the first switch with each of the switches being of a type which can switch off the discharge tube, a tapping point between the two switches being connected to a control device of the switches whereby, in case the first switch fails to open at the end of a desired irradiation period, the control device of the switches attempts to open the second switch.

An irradiation device of the aforementioned kind is described, for example, in U.S. Pat. No. 4,303,867 (12/1/81). In this known device, if a switch fails to open at the end of a desired irradiation period, attempts are made to open the other switch in order to ensure that the discharge tube is switched off. A disadvantage of this known irradiation device is, however, that in normal operation an irradiation is terminated in that on some occasions the first switch interrupts the current through the discharge tube and on the other occasions the second switch interrupts the current through the discharge tube. This is due to the fact that in the known device, in normal operation, a fixed order of succession of operating these switches fails. This means that already in normal operation of the device the two switches are subjected to wear, for example, to burning-in. If in this case under exceptional conditions one of the switches fails to open at the end of a desired irradiation period, attempts are made—as already stated—to open the other switch in order that the discharge tube is switched off as yet. However, since under these exceptional conditions this has to be effected by means of a switch which has often been subjected already to a large amount of wear, this switching-off is sometimes not very reliable. If this switching-off does not take place, an overdosage occurs during irradiation, which could lead to skin burning when a person is irradiated.

The invention has for its object to reduce for an irradiation device of the kind mentioned in the opening paragraph the risk of an overdosage of irradiation.

An irradiation device according to the invention is provided with two input terminals intended to be connected to an electric voltage source. These two input terminals are interconnected by means of a series arrangement of at least one metal vapour discharge tube shunted by an electrically conducting circuit element, a first switch, and a second switch provided with a switching arm, the switching arm being in electrical contact with a part of the second switch remote from the first switch. Each of these switches are of a type which can switch off the discharge tube. A tapping point is provided between the two switches and is connected to a control device of the switches whereby, in case the first switch fails to open at the end of a desired irradiation period, the control device of the switches attempts to open the second switch. The invention is characterised in that in the opened state of the second switch the switching arm contacts an auxiliary contact of this second switch connected to the control device, an electrical voltage difference between the tapping point and the auxiliary contact blocking the operation of the control device.

An advantage of this irradiation device is that, in normal operation, the current—through the discharge tube—is switched only by the first switch. The second switch is spared in that in normal operation it is invariably switched without the flow of current. The switching-off of the discharge tube under exceptional conditions, i.e. when the first switch, at the end of a desired irradiation period does not open, can then be more reliable. In fact, the second switch has then not yet, or has hardly, been subjected to wear.

A further advantage of the irradiation device according to the invention is that the circuit for blocking the control device can be simple.

The following remarks should be made about the order of switching. In an irradiation device according to the invention, an electrical voltage difference will be present—in the switched-on condition—between the tapping point and the auxiliary contact if the first switch is closed and the second switch is opened. In this situation blocking the control device implies that when the device is switched off—in the normal condition—first the first switch should be opened and that only then should the second switch be opened without a flow of current. Before switching on, the second switch should first be closed and only then should the first switch be closed.

If under exceptional conditions the second switch has switched off the discharge tube, it is no longer possible to switch on this discharge tube again. In fact, the situation blocking the control device is then obtained.

In addition, the following remarks can be made. The invention is based on the idea that preference is given to one of the switches as to switching on and switching off the discharge tube in the normal condition. This preference is given to the so-called first switch. This means that the aforementioned combination of the closed first switch and an opened second switch points to a defect. This can be detected in a simpler manner than an error in the said known irradiation device in which no preference was given to one of the two switches. Of course, the said preference further means—as already stated—that the second switch is spared wear and tear and is used only then when there is a risk of overdosage of irradiation.

The first switch could be, for example, in the form of a semiconductor switch. This has the disadvantage that the sometimes comparatively large electrical currents through the discharge tube—which also flow through this first switch—may sometimes heat this switch to rather high temperatures. This has an adverse effect on the life of this switch and is thus less acceptable for the irradiation device.

In a preferred embodiment of an irradiation device according to the invention, in which also the first switch is provided with a switching arm, the switching contact surface area of the second switch is—apart from the auxiliary contact—at most half the switching contact surface area of the first switch.

An advantage of this preferred embodiment is that the first switch in the normal condition is not heated excessively and that the second switch—which need not be used except in emergency cases—can be small. It should be noted that in the known irradiation device, in which no preference was given to one of the switches, both switches had to be substantially of the same size.

In a further preferred embodiment of an irradiation device according to the invention, the auxiliary contact is connected—via the connection to the control device—to a connection element of a light source of an opto-electronic coupling element, while the tapping point is connected—via its connection to the control device—to another connection element of this light source, and a photosensitive part of the opto-electronic coupling element is connected between ground and a reset part of the control device.

An advantage of this preferred embodiment is that the information about the given switching conditions of the switches is passed on the control device in a simple and safe manner.

Figure 2:
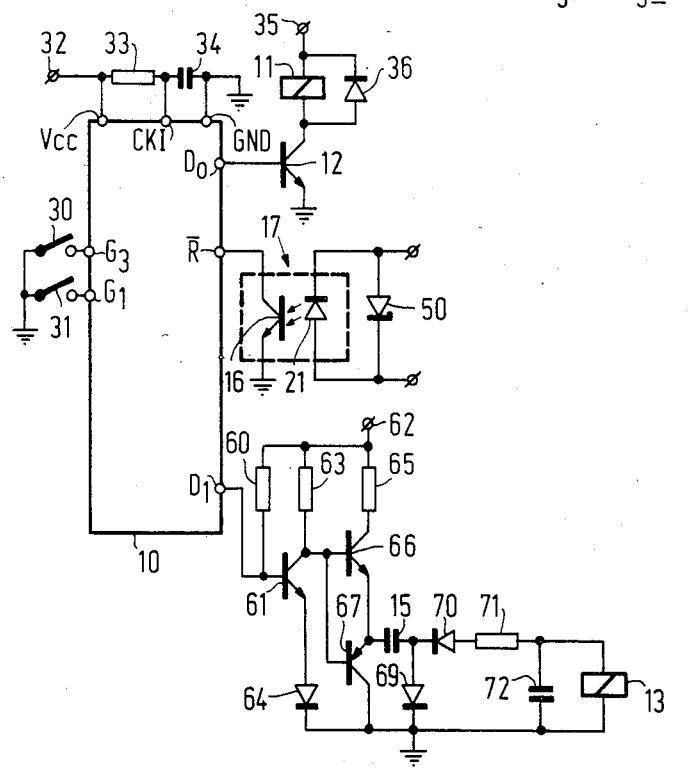

An embodiment of the invention will be described more fully with reference to a drawing. In the drawing:

FIG. 1 shows a principle circuit diagram of an electric circuit of an irradiation device according to the invention; and FIG. 2 shows in greater detail an electric circuit of a control device of the irradiation device shown in FIG. 1.

In FIG. 1, the reference numerals 1 and 2 designate input terminals which are intended to be connected to an alternating voltage source, for example, of 220 V, 50 Hz. The terminals 1 and 2 are interconnected through a series arrangement of a first switch 3, a second switch 4, a metal vapour discharge tube 5 and an inductive stabilization ballast 5a. The discharge tube 5 is a high-pressure mercury vapour discharge lamp for producing ultraviolet radiation. Persons are irradiated with by the tube 5. The irradiation device is designated as a solarium. The series arrangement 1, 3, 4, 5, 5a, 2 constitutes the main current circuit. The series arrangement of the discharge tube 5 and its stabilization ballast 5a is shunted by a circuit comprising a capacitor 5b in order inter alia to improve the power factor (cos $\phi$). The shunt circuit may also comprise—if desired—a temperature-sensitive resistor.

A tapping point 6 is provided between the switches 3 and 4. Each of the switches 3 and 4 is provided with a respective switching arm. These switches are in the form of relay contacts. The second switch 4 is provided with an auxiliary contact denoted by reference numeral 7 and its switching arm is in electrical contact with a part of said switch remote from the first switch 3.

The switches 3 and 4 are actuated through a control device. The latter comprises an integrated circuit (i.c.) 10 and a few circuits connected thereto. These circuits include a circuit (11, 12) comprising a first relay 11 and a further circuit (14, 15, 13) comprising a second relay 13. Moreover, a photosensitive part 16 of an opto-electronic coupling element 17 is connected to the i.c. 10. The relay 11 actuates the first switch 3. The relay 13 actuates the second switch 4.

The auxiliary contact 7 of the second switch 4 is connected through a resistor 20 and a light source 21, e.g. in the form of a diode, of the opto-electronic coupling element 17, to the tapping point 6.

As will be explained hereinafter with reference to FIG. 2, when—in the normal condition—the discharge tube 5 is made operative, first the switch 4 and then the switch 3 are closed. When in the normal condition the discharge tube 5 is switched off, first the switch 3 is opened and only then is the switch 4 opened. In the said opened state of the switch 4, its switching arm contacts the auxiliary contact 7.

However, if at the end of a desired irradiation period the switch 3 should fail to open, the second switch 4 will interrupt the current through the discharge tube 5. If this has taken place, the diode 21 of the opto-electronic coupling element 17 will luminesce because then a voltage difference has been produced between the auxiliary contact 7 and the tapping point 6. This is due to the fact that then a current-conveying circuit 2, 5b, 7, 20, 21, 6, closed switch 3 and terminal 1 has been formed. Due to the illumination of the photo-sensitive part 16 of the coupling element 17 which then occurs, the operation of the control device will then be blocked so that it becomes impossible for the discharge tube 5 to be switched on again. The device will then have to be taken first to the service station.

In FIG. 2, corresponding reference numerals denote the same parts as in FIG. 1. The i.c. 10 (a micro-controller) in this embodiment is of the type "COPS 410 L" of "National Semiconductor".

The terminal $G_3$ of the i.c. 10 has connected to it a starting switch 30, the other end of which is connected to ground. The terminal $G_1$ of the i.c. 10 has connected to it a stopping switch 31, the other end of which is connected to ground.

Provision is further made of a series arrangement comprising a terminal 32, a resistor 33, a capacitor 34 and a ground terminal. A connection point $V_{cc}$ of the i.c. 10 is connected to the terminal 32. A junction between the resistor 33 and the capacitor 34 is connected to the connection point CKI. The ground terminal is connected to a connection point GND of the i.c. 10.

The connection point $D_0$ of the i.c. 10 is connected to the base of the npn transistor 12. The relay 11 is connected to the collector of the transistor 12. The other end of the relay 11 is connected to a terminal 35. The relay 11 is shunted by a protection diode 36. The emitter of the transistor 12 is connected to ground.

A connection point $\overline{R}$ (reset) of the i.c. 10 is connected through the photosensitive part 16 of the coupling element 17 to ground. A protecting Zener diode is connected parallel to the light source 21.

The circuit of the relay 13 is connected to the connection $D_1$ of the i.c. 10. This circuit comprises a resistor 60. A tapping point between the resistor 60 and the connection $D_1$ is connected to the base of an npn transistor 61. Reference numeral 62 designates an input terminal. The latter is connected to the resistor 60 and to a resistor 63. The other end of the resistor 63 is connected to the collector of the transistor 61, the emitter of which is connected to ground through a diode 64. Further, the terminal 62 is connected through a resistor 65 to the collector of a transistor 66. The collector of the transistor 61 is connected both to the base of the npn transistor 66 and to the base of the pnp transistor 67. The emitters of the transistors 66 and 67 are interconnected. The collector of the transistor 67 is connected to ground.

A junction between the emitters of the transistors 66 and 67 is connected to the capacitor 15. The other end of this capacitor 15 is connected to ground through a diode 69 and is further connected to a diode 70. The other end of this diode 70 is connected through a series arrangement of a resistor 71 and a capacitor 72 to ground The capacitor 72 is shunted by the relay 13. This relay actuates the second switch 4 (see FIG. 1).

An auxiliary voltage of approximately +5 V is applied to the terminal 32. An auxiliary voltage of approximately +30 V is applied to each of the terminals 35 and 62. Supply devices for this auxiliary voltage are not shown.

Briefly the operation of the irradiation device described is as follows. After the starting switch 30 has closed (see FIG. 2), a rectangular voltage is supplied through the connection point $D_1$ to the base of the transistor 61. This leads to the capacitor 15 being intermittently charged via the circuit 62, 65, 66, 15, 69. After each charge, the capacitor 15 is discharged again through the circuit 67, 72, 13, 71, 70, 15. Thus, the capacitor 72 is charged negatively. When across this capacitor 72 a voltage is reached which is equal to the threshold voltage of the relay 13, this relay will be energized and the switch 4 (see FIG. 1) will close.

A good second after the starting switch 30 has closed, namely after the relay 13 has been energized, a direct voltage appears at the base of the transistor 12 via $D_0$. The relevant time delay—of a good second—is realised by means of the i.c. 10. The occurrence of the direct voltage leads to the transistor 12 becoming conductive. This results in the relay 11 being energized and thus the switch 3 closes.

In a normal situation, the switch 3 will be opened—for terminating the irradiation by the discharge tube 5—in that the direct voltage at the base of the transistor 12 is removed.

Due to the fact that the rectangular voltage supplied through $D_1$ is then removed after a delay, the relay 13 is also de-energized with a further delay due to the RC effect in this relay circuit. Consequently, the switch 4 opens later than the switch 3.

If under exceptional conditions the switch 3 should fail to open at the end of a desired irradiation period—or if this switch does not receive a command to open—the switch 4 switches off the discharge tube 5 through the relay 13.

Through the aforementioned circuit (see FIG. 1): 2, 5b, 7, 20, 21, 6, 3, 1 the diode 21 then luminesces and consequently connects the $\overline{R}$ (reset) input of the i.c. 10 to ground via the photosensitive part 16. Thus, the further operation of the control device is blocked.

The control circuit of the relay 13 further includes the safety feature that, if no pulsatory signal is passed on via $D_1$, the relay 13—also in the case of defective transistors 61, 66 and 67—cannot be energized so that the discharge tube 5 then cannot possibly be made operative.

In an embodiment, the switching contact surface area of the second switch 4—apart from the auxiliary contact—was only approximately a quarter of the switching contact surface area of the first switch 3.

In the embodiment described, the circuit elements had the following approximate values:

| | |
|---|---|
| resistor 33 | 82 kOhm |
| resistor 60 | 18 kOhm |
| resistor 63 | 10 kOhm |
| resistor 65 | 150 Ohm |
| resistor 71 | 33 Ohm |
| capacitor 5b | 4 × 25 μF |

-continued

| | |
|---|---|
| capacitor 15 | 100 μF |
| capacitor 34 | 56 pF |
| capacitor 72 | 100 μF. |

The discharge tube 5 with the stabilization ballast 5a in this case represented four parallel circuits each comprising a discharge tube of the aforementioned kind of 400 W with the associated inductive stabilization ballast.

In the irradiation device described, a high degree of protection from an overdosage of irradiation is combined with a simple means to detect a defect.

What is claimed is:

1. An irradiation device comprising two input terminals for connection to an electric voltage source, means interconnecting the two input terminals through a series arrangement of at least one metal vapour discharge tube shunted by an electrically conducting circuit element, a first switch, and a second switch provided with a switching arm in electrical contact with a part of the second switch remote from the first switch, each of the switches being of a type which can switch off the discharge tube, and means coupling a tapping point between the two switches to a control device for the switches, whereby, if the first switch fails to open at the end of a desired irradiation period, the control device for the switches opens the second switch, characterised in that in the open state of the second switch the switching arm contacts an auxiliary contact of the second switch coupled to the control device, an electrical voltage difference between the tapping point and the auxiliary contact blocking the operation of the control device.

2. An irradiation device as claimed in claim 1, wherein the first switch is provided with a switching arm, characterised in that—apart from the auxiliary contact—the switching contact surface area of the second switch is at most half the switching contact surface area of the first switch.

3. An irradiation device as claimed in claim 1, characterised in that the auxiliary contact is coupled —through the connection to the control device—to a connection member of a light source of an opto-electronic coupling element, the tapping point is connected—through its coupling to the control device—to another connection of the light source, and a photo-sensitive part of the opto-electronic coupling element is connected between ground and a reset part of the control device.

4. An irradiation device as claimed in claim 2, characterized in that the auxiliary contact is connected—through the coupling to the control device—to a connection member of a light source of an opto-electronic coupling element, the tapping point is connected—through its coupling to the control device—to another connection member of the light source, and a photosensitive part of the opto-electronic coupling element is connected between ground and a reset part of the control device.

\* \* \* \* \*

UNITED STATES PATENT AND TRADEMARK OFFICE
CERTIFICATE OF CORRECTION

PATENT NO. : 4,570,109
DATED : February 11, 1986
INVENTOR(S) : HAAYO NICOLAI AND HENDRICUS J. DUIPMANS It is certified that error appears in the above-identified patent and that said Letters Patent is hereby corrected as shown below:

COL. 6, Line 47, after "connection" insert --member--.

Signed and Sealed this

Twenty-first Day of October, 1986

[SEAL]

Attest:

DONALD J. QUIGG

Attesting Officer     Commissioner of Patents and Trademarks